(12) United States Patent
Khanna et al.

(10) Patent No.: US 11,106,516 B2
(45) Date of Patent: Aug. 31, 2021

(54) SELECTIVE SERVICE-SPECIFIC CONTROLS IN A VIRTUALIZED CONTAINER ENVIRONMENT

(71) Applicant: International Business Machines Corporation, Armonk, NY (US)

(72) Inventors: Rashmi Khanna, Bangalore (IN); Magesh Kumar Sivaswamy, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 181 days.

(21) Appl. No.: 16/380,271

(22) Filed: Apr. 10, 2019

(65) Prior Publication Data

US 2020/0327006 A1 Oct. 15, 2020

(51) Int. Cl.
| | | |
|---|---|---|
| *G06F 11/00* | (2006.01) | |
| *G06F 11/07* | (2006.01) | |
| *G06F 9/445* | (2018.01) | |
| *G06F 9/455* | (2018.01) | |
| *G06F 9/54* | (2006.01) | |
| *G06F 11/14* | (2006.01) | |
| *G06F 11/20* | (2006.01) | |

(52) U.S. Cl.
CPC ...... *G06F 11/0712* (2013.01); *G06F 9/44521* (2013.01); *G06F 9/45558* (2013.01); *G06F 9/54* (2013.01); *G06F 11/0736* (2013.01); *G06F 11/0793* (2013.01); *G06F 11/1402* (2013.01); *G06F 11/20* (2013.01)

(58) Field of Classification Search
None
See application file for complete search history.

(56) References Cited

U.S. PATENT DOCUMENTS

| | | | |
|---|---|---|---|
| 7,275,251 B2 | 9/2007 | Gitelson et al. | |
| 7,646,725 B1 | 1/2010 | Soukup et al. | |
| 9,590,872 B1 | 3/2017 | Jagtap et al. | |
| 2004/0226028 A1 | 11/2004 | Gitelson et al. | |
| 2014/0122435 A1* | 5/2014 | Chavda | G06F 11/1451 707/645 |

(Continued)

FOREIGN PATENT DOCUMENTS

WO 2017213643 A1 12/2017

OTHER PUBLICATIONS

Google Scholar/Patents—text refined (Year: 2020).*
Google Patents/Scholar - text refined (Year: 2021).*
Google Scholar/Patents—text refined (Year: 2021).*

*Primary Examiner* — Christopher S McCarthy
(74) *Attorney, Agent, or Firm* — Christopher M. Pignato; Nicholas L. Cadmus (57) ABSTRACT

A containerized application is executed within a container in a virtualized container environment. The containerized application exposes service and diagnostic interfaces that allow a container manager to interact with and control different code paths that provide different services from the containerized application. Using the exposed service and diagnostic interfaces, responsive to a container crash and prior to bringing the containerized application back online within the virtualized container environment after the container crash, functionality of the different code paths that provide the different services from the containerized application is validated.

17 Claims, 6 Drawing Sheets

(56) References Cited

U.S. PATENT DOCUMENTS

2017/0244593 A1\* 8/2017 Rangasamy ........ H04L 67/1095
2017/0300394 A1\* 10/2017 Raut ................... G06F 11/2048
2018/0048716 A1 2/2018 Madhayyan et al.
2018/0144123 A1 5/2018 Levin et al.
2019/0188094 A1\* 6/2019 Ramamoorthi ..... G06F 11/2023

\* cited by examiner

SELECTIVE SERVICE-SPECIFIC CONTROLS IN A VIRTUALIZED CONTAINER ENVIRONMENT

BACKGROUND

The present invention relates to virtualized container environments. More particularly, the present invention relates to selective service-specific controls in a virtualized container environment.

A virtualized container environment is a distributed computing environment formed from multiple distributed and inter-operational hardware computing platforms. A "container" represents a compartmentalized application or set of applications capable of being deployed as a unit to execute on one or more hardware computing platforms within a virtualized container environment.

SUMMARY

A computer-implemented method includes, by a processor that executes a container manager: executing, within a container in a virtualized container environment, a containerized application that exposes service and diagnostic interfaces that allow the container manager to interact with and control different code paths that provide different services from the containerized application; and validating, using the exposed service and diagnostic interfaces responsive to a container crash, functionality of the different code paths that provide the different services from the containerized application prior to bringing the containerized application back online within the virtualized container environment after the container crash.

A system that performs the computer-implemented method and a computer program product that causes a computer to perform the computer-implemented method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides selective service-specific controls in a virtualized container environment. The present technology solves a recognized container management problem by providing technology that includes a new form of granularized application/service control that performs selective enabling and disabling of individual services/code paths of a containerized application within complex virtualized container-based computing environments.

Some terminology used in describing some embodiments of the present invention will now be explained. A "container" is hereby defined as a lightweight, portable, and self-sufficient executable entity capable of being automatically deployed to and run from virtually anywhere within virtualized container environment (e.g., a collection of servers, a cloud computing environment, etc.). A "service interface" is hereby defined as an application programming interface (API) that provides a set of API calls that are usable to control a service. A "service" is hereby defined as a functional sub-portion of an application that is executed within a container and that exposes a functional interface into the application via an exposed service and diagnostic interface that is usable to control the functional sub-portion of the application. A "code path" is hereby defined as an integrated set of code of a functional sub-portion of an application that provides a service and that provides the service and diagnostic interface usable to control the service as a sub-portion of the application. A "control path" is hereby defined as a code path of an application that provides a particular service as a sub-portion of an application plus any additional external inter-connectivity/controls utilized by the service, including external elements such as network interconnections, authentication services, payment gateways, and other external elements used by a service.

A containerized application is executed within a container in a virtualized container environment. The containerized application exposes service and diagnostic interfaces that allow a container manager to interact with and control different code paths that provide different services from the containerized application. Using the exposed service and diagnostic interfaces, responsive to a container crash, and prior to bringing the containerized application back online within the virtualized container environment after the container crash, functionality of the different code paths that provide the different services from the containerized application is validated.

It should be noted that conception of the present subject matter resulted from recognition of certain limitations associated with containerized computing services. For example, it was observed that containers crash whenever there is an application error that is propagated to the container. However, conventional container managers merely restart the container when it crashes without any sort of a check or remediation, and do so without ensuring that any necessary changes to the containerized applications are made that prevent the container from crashing again. Further, it was observed that conventional container managers, like pods and sidecars, perform various management functions that include health checks, monitoring, and handling of container crashes (by restarting the container). However, conventional container managers are not aware of the applications and services exposed by applications running on the container, and as a result are not aware of the basic conditions along a control path that are required for the applications to run successfully. It was determined from these several observations that making the container aware of the services exposed by the applications being run on the container, and using this information at a container manager, via exposed service and diagnostic interfaces of the individual services to evaluate service functional performance and selectively enable/disable certain services in the applications, would improve container management and container operational reliability and stability.

The present subject matter improves container management and upgrades responsive to detected container crashes and/or core dumps by providing for selective enabling and disabling of application services and code paths, as described above and in more detail below. As such, improved deployed container stability is obtained through use of the present technology.

The technology described herein operates by formalizing service and diagnostic interfaces to be exposed by the applications being run on the container, and making the container and container manager aware of the service and diagnostic interfaces exposed by the applications being run on the container. This service and diagnostic interface information is used at a container manager to selectively enable/disable and validate individual services in the applications to improve container management and container operational reliability and stability.

Based upon the technology described herein, a container manager responds to a container crash by identifying individual services provided by the container, and by performing individual service interface tests to determine which service(s) have restarted properly and which service(s) are encountering errors. The container manager selectively re-enables properly functioning services for use within a complex virtualized computing environment, while disabling any service(s) that are encountering errors on restart. The container manager may either bring the container back to operational status or may perform any corrections/updates to the containerized applications that are identified and appropriate to correct the issue(s) that caused the container to crash. As a result, the technology described herein improves container stability by identifying problems early in deployment of containers or in response to service and/or control interface upgrades by rapidly remediating those problems. As a result, the technology described herein improves maintenance and continuity of services in container-based computing environments.

Regarding available service and diagnostic interface tests performed as part of a restart of a container, the container manager identifies the individual services offered by applications in the container, and confirms that the individual services offered by applications in the container are both internally operational and have functional designated external control paths. Regarding internal operational functionality, the container manager executes stand-alone tests that are independent of external interaction, as defined within the respective service and diagnostic interfaces. Regarding external control paths, the container manager confirms operational network connectivity, validate whether certain routes are exposed and operational, and perform other functional checks of other individual service interfaces. These internal and external control path tests are performed prior to bringing the services of a container back online within the virtualized computing environment.

The container manager additionally has access to upgrade information, both for the containerized applications that provide the services and for the external interfaces utilized by the respective containerized applications. In response to identifying an upgrade or change to either a containerized application or an external interface used by such an application, the container manager can change the container itself to ensure that the container will not crash again for the same reason. For example, the container manager can apply an identified patch or upgrade that is available for the containerized application to include a fix, a patch upgrade, a network change, or to perform a maintenance schedule. Additionally and/or alternatively, the container manager can temporarily revert an application upgrade identified to be incompatible with one or more external service interfaces (e.g., payment gateways, etc.).

This service-level awareness is built into the container manager itself, such that the container manager granularly controls bringing the container back up and back online in a deterministic manner, and as a result, ensures that the container will not crash again for the same reason. In this way, the technology described herein further provides temporary stability to a crashed application and allow use of some services provided by an application until a permanent solution is available and applied.

It should be noted that an application hosted in a virtualized environment may over a period of time go through life cycle management. Life cycle management can be planned (e.g., a patch, an upgrade, an administrator related process, etc.). Further, unplanned application cycles, such as a crash, may either be of the whole application or of part of the application. To identify causes of container crashes, the container manager detects a crash/core dump or other application cycle, and analyzes both log and crash records that are being or have been dumped during that event. Based upon the analysis of the log and crash records, the container manager identifies the operation(s) (e.g., one or more code paths) that caused the crash. The container manager can then bring the application back online to restore at least partial services of the application, without activating the problematic code path(s) by selectively disabling the errant code path(s).

To facilitate individual service control granularity to allow disabling of individual code paths, the applications themselves that are hosted on a container are designed with service and diagnostic interfaces and sub-interfaces that allow control and validation of the individual services provided by the applications. As such, the applications themselves expose service and diagnostic interfaces that allow selective enabling/disabling control logic by which to selectively enable/disable the respective services for which the service and diagnostic interfaces are exposed.

In summary, the technology described herein makes the container manager aware of the application(s) running on the container, and the services the application(s) expose. The container manager selectively brings up or brings down services running in the container as part of the maintenance lifecycle and in response to crashes/core dumps. The container manager further accesses and control different control paths to external services to manage the different services provided by and to an application. As such, the technology described herein brings intelligence into a container manager that allows the container manager to better handle crashes, while restoring the application instance with certain features that caused the crash disabled. The container manger looks at the logs and performs available service interface tests to confirm that fundamental application services run and execute properly prior to allowing the application to be made available for use. The container manager also performs tests to confirm that the service is capable of accesses other external resources outside of application control, such as external connectivity, validating routes, and other external interactions. An application running in a container exposes service and diagnostic interfaces usable by the container manager to interact with and manage the individual services provided by the application. As such, the technology described herein allows a container manager to manage container crashes more effectively than conventional technology by providing the container manager with the intelligence to bring up the container instance with subsets of features enabled to ensure container stability until a permanent solution is identified.

As an example of an application that may have different service and diagnostic interfaces, a bank portal or transport ticketing system may have several service interfaces exposed by different parts of the application. The application itself may be run on a single virtualized node or on multiple virtualized nodes. These different application/service interfaces may each execute a different code path in the application, and this path information may be logged during runtime as part of application logging and audit information. Some examples of code paths include a user trying to transfer funds through a specific method that is available in the bank portal, or a user trying to reserve flight tickets on a certain airline.

It should be noted that a container crash can occur when a specific operation is performed in the overall application, and some aspect of that specific operation is not handled properly within the application or by an external service/interface. For example, a part of the application, such as a payment gateway or a configured real-time gross settlement (RTGS) funds-transfer method, may have crashed the overall application either due to external or internal issues (e.g., due to missing error handling, etc.). Instead of bringing down and restarting the entire application, the container manager technology described herein allows the container manager to selectively disable the parts of the application that caused the crash (e.g., the payment gateway linkages, or the RTGS interface linkages), and bring up the remainder of the application. As such, while one or more of the payment interfaces is selectively disabled, the overall stability of the container is improved and error reporting is carried out to ensure the application will not crash again for the same reason until a proper fix is found.

As introduced above, the application itself may be re-designed to facilitate this improved stability by exposing service and diagnostic interfaces for selective enabling/disabling and testing of individual services. The applications may also be designed to output logging information that identifies the various code paths that are executed over time, and the container manager can use this logging information at the time of a crash to determine which of the various application interfaces likely caused the crash. Applications may also be re-designed to provide additional sub-interfaces by which the container manager validates the individual code paths/interfaces. This validation includes both internal checks and external checks that are performed prior to re-introducing the restarted container into the virtual environment. As such, the container manager performs these selective enabling/disabling and validation operations to ensure that the application/container can be re-introduced into the virtual environment without causing an additional crash for the same reason(s).

The selective service-specific controls in a virtualized container environment described herein is performed in real time to allow prompt control and validation of individual services within applications executed within a container. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the selective service-specific controls in a virtualized container environment described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
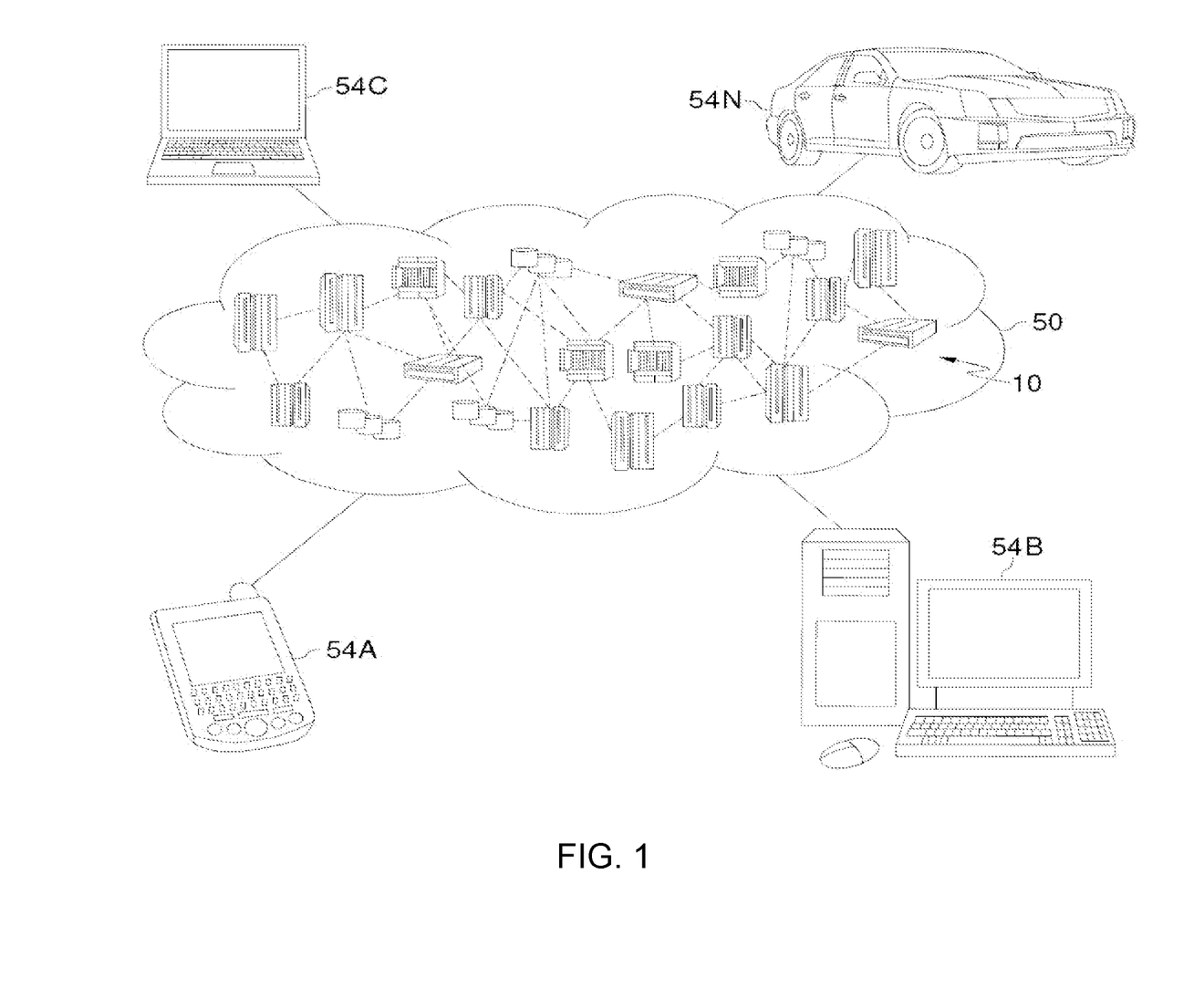
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
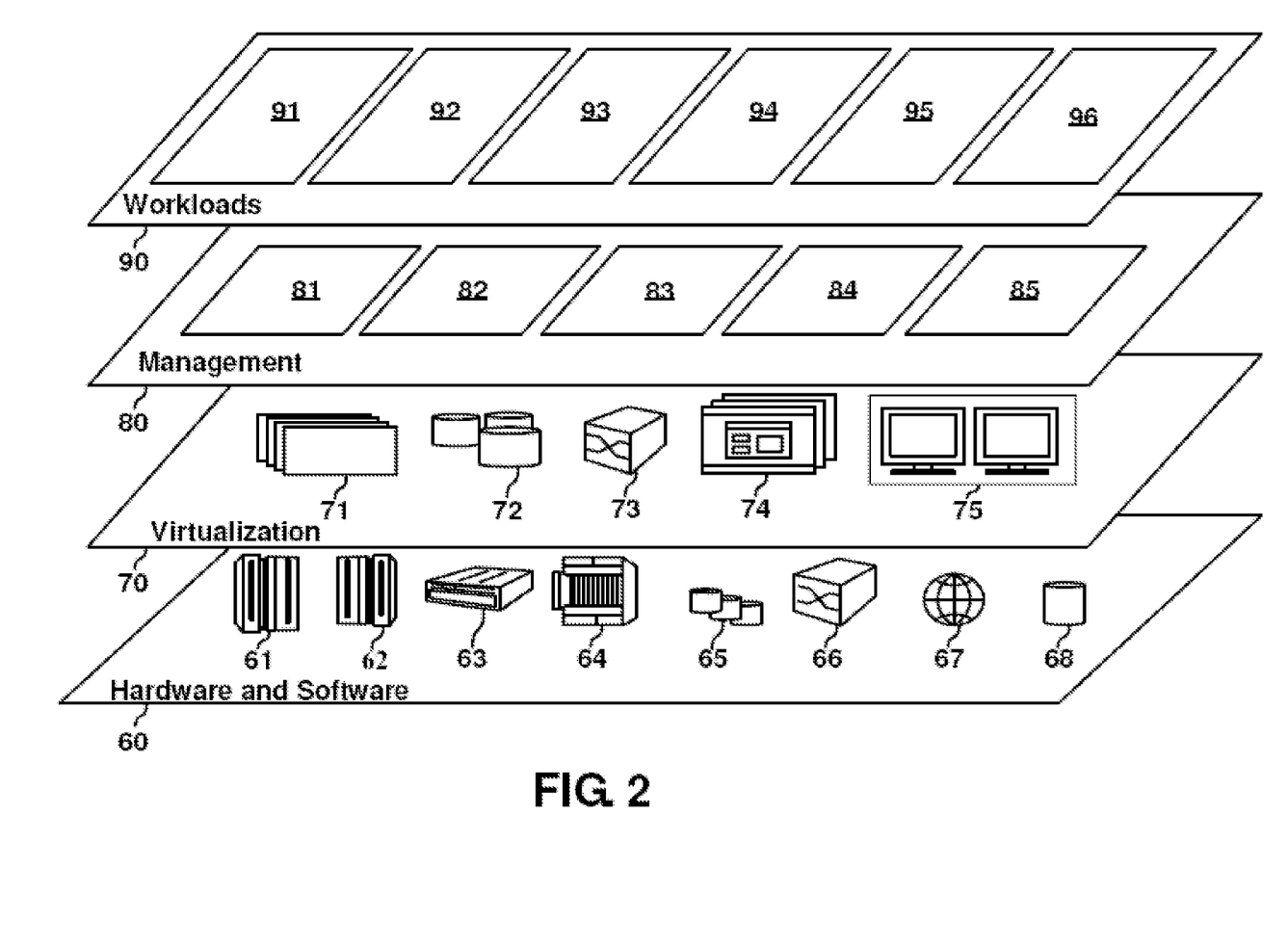
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective service-specific controls in a virtualized container environment 96.

Regarding alternative implementation options, FIGS. 3 and 4 below are directed to such alternatives. It should be understood that the various alternatives may be combined with or substituted with the implementation options described above, as appropriate for the given implementation.

Figure 3:
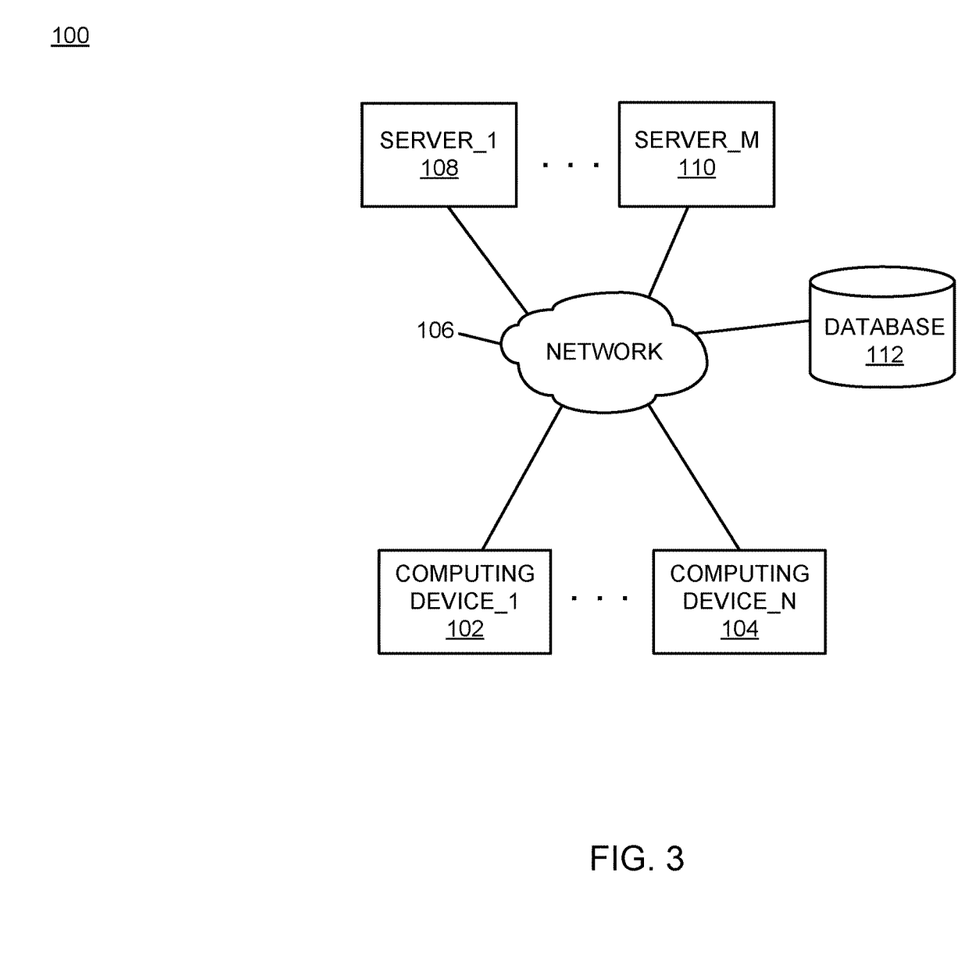
FIG. 3 is a block diagram of an example of an implementation of a system for selective service-specific controls in a virtualized container environment according to an embodiment of the present subject matter.

FIG. 3 is a block diagram of an example of an implementation of a system 100 for selective service-specific controls in a virtualized container environment. A computing device_1 102 through a computing device_N 104 communicate via a network 106 with several other devices. The other devices include a server_1 108 through a server_M 110 that allow users of the computing device_1 102 through the computing device_N 104 to interact with container-based service services.

A database 112 provides storage for application service-interface details, application service-interface control details, and application service-interface validation details to allow control of individual service paths within applications. The database 112 may also store crash and core dump logs, application service enablement/disablement information, and application service-path validation information for use within the system 100 to perform the selective service-specific controls in a virtualized container environment described herein.

As will be described in more detail below in association with FIG. 4 through FIG. 6, the server_1 108 through the server_M 110 may each provide automated selective service-specific controls in a virtualized container environment. The selective service-specific controls in a virtualized container environment is based upon application service-specific control of execution of individual portions of applications that are executed by the server_1 108 through the server_M 110 to provide services to users of the computing device_1 102 through the computing device_N 104. It should be noted that the selective service-specific controls in a virtualized container environment may additionally and/or alternatively be implemented within one or more of the computing device_1 102 through the computing device_N 104, as appropriate for a given implementation.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, a container server, or other data server device.

The database 112 may include a relational database, an object database, or any other storage type of device. As such, the database 112 may be implemented as appropriate for a given implementation.

Figure 4:
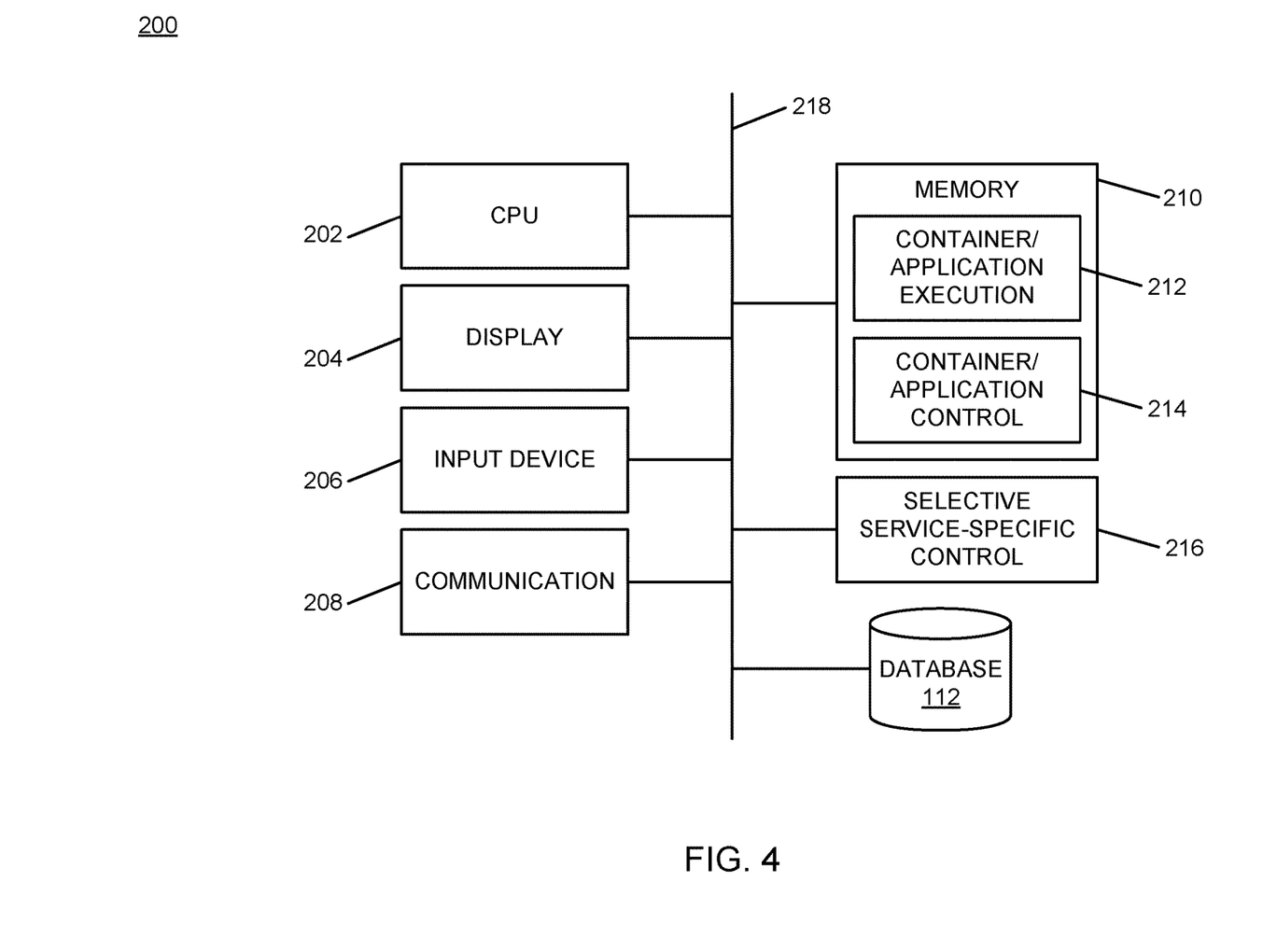
FIG. 4 is a block diagram of an example of an implementation of a core processing module capable of performing selective service-specific controls in a virtualized container environment according to an embodiment of the present subject matter.

FIG. 4 is a block diagram of an example of an implementation of a core processing module 200 capable of performing selective service-specific controls in a virtualized container environment. The core processing module 200 is associated with either the computing device_1 102 through the computing device_N 104 or with the server_1 108 through the server_M 110, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 provides different and complementary processing of selective service-specific controls in a virtualized container environment in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A memory 210 includes a container/application execution area 212 that provides execution space for containers and/or containerized applications within the core processing module 200. As described above, the applications that are controlled as described herein may be designed to expose different control interfaces that each allows control of individual service interfaces (code paths).

The memory 210 also includes a container/application control storage area 214 that provides storage for container and application control-path information within the core processing module 200. As also described above, the container and application control-path information is used to store information usable to enable/disable individual services and to validate individual services associated within containers and/or containerized applications.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A selective service-specific control module 216 is also illustrated. The selective service-specific control module 216 provides selective control and validation of individual services that are executed in association with the core processing module 200, as described above and in more detail below. The selective service-specific control module 216 implements the automated selective service-specific controls in a virtualized container environment of the core processing module 200.

It should also be noted that the selective service-specific control module 216 may form a portion of other circuitry described without departure from the scope of the present subject matter. The selective service-specific control module 216 may form a portion of an interrupt service routine (ISR), a portion of an operating system, or a portion of an application without departure from the scope of the present subject matter. The selective service-specific control module 216 may also include an embedded device with circuitry designed specifically to perform the processing described herein as appropriate for a given implementation.

The database 112 is again shown within FIG. 4 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the selective service-specific control module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 5:
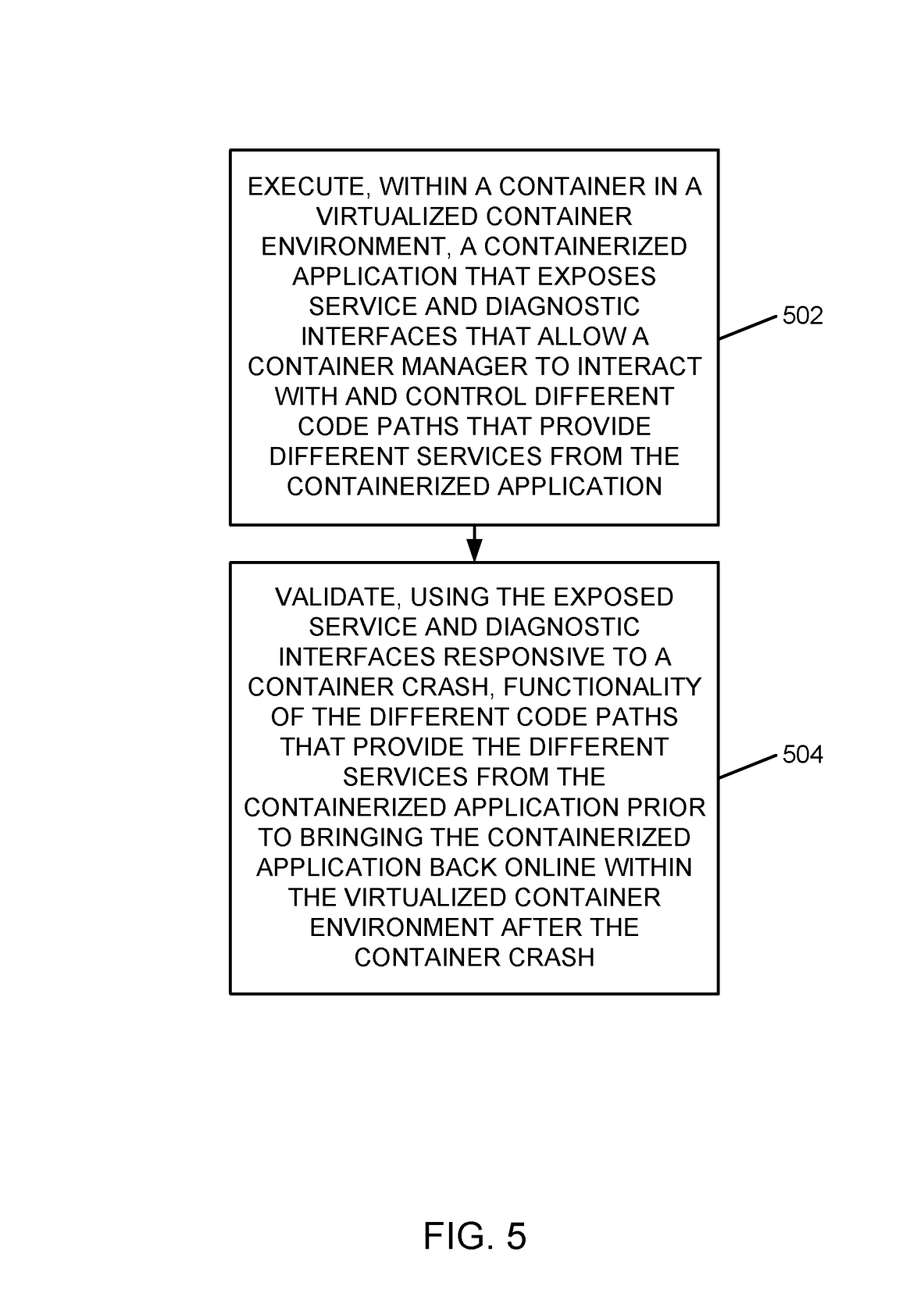
FIG. 5 is a flow chart of an example of an implementation of a process for selective service-specific controls in a virtualized container environment according to an embodiment of the present subject matter.
Figure 6:
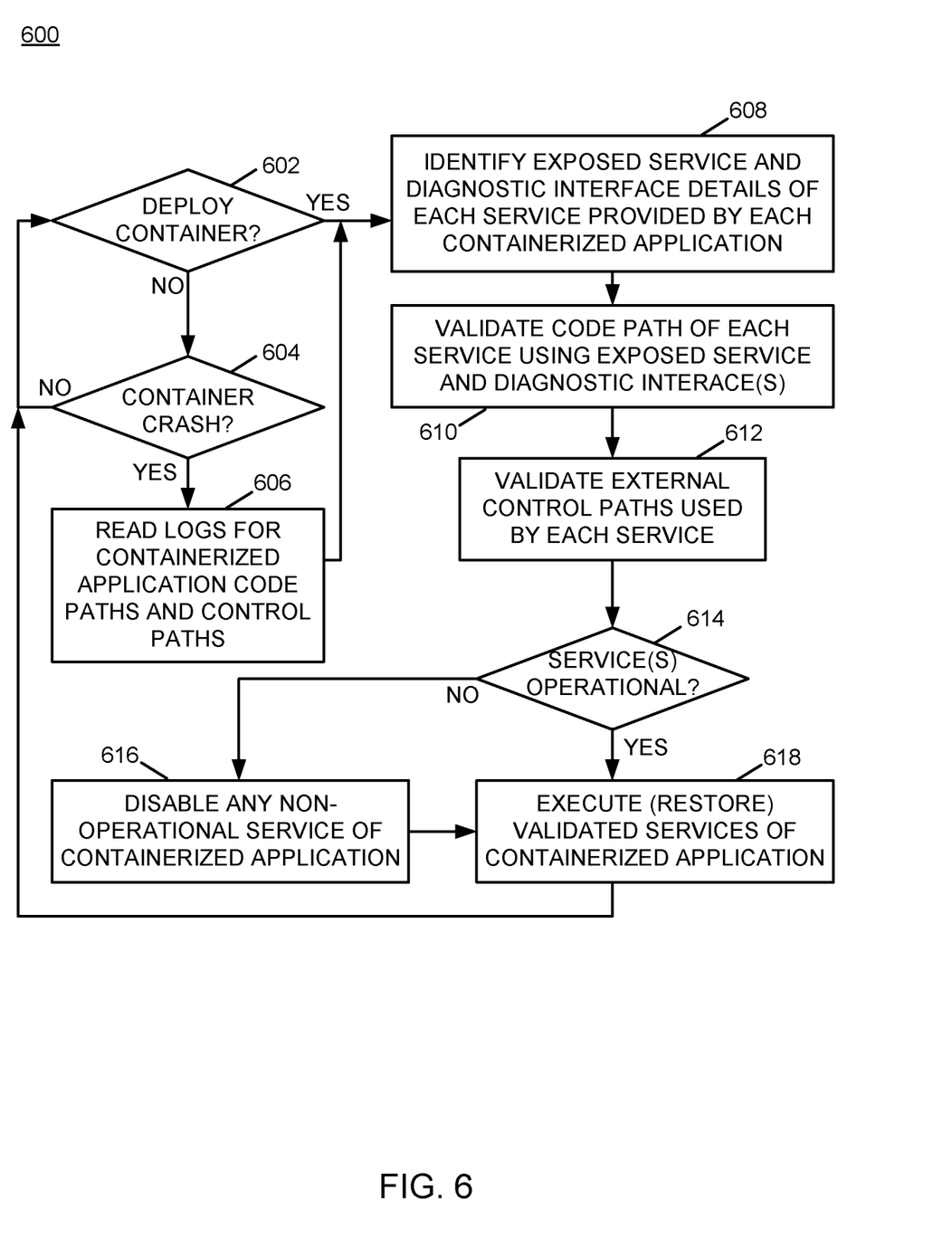
FIG. 6 is a flow chart of an example of an implementation of a process that provides additional details of options for implementing selective service-specific controls in a virtualized container environment according to an embodiment of the present subject matter.

FIG. 5 through FIG. 6 described below represent example processes that are executed by devices, such as the core processing module 200, to perform the selective service-specific controls in a virtualized container environment associated with the present subject matter. Many other variations on the example processes are possible and all are considered within the scope of the present subject matter. The example processes are performed by modules, such as the selective service-specific control module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for selective service-specific controls in a virtualized container environment. The process 500 represents a computer-implemented method of performing the selective container-based service controls described herein. At block 502, the process 500 executes, within a container in a virtualized container environment, a containerized application that exposes service and diagnostic interfaces that allow a container manager to interact with and control different code paths that provide different services from the containerized application. At block 504, the process 500 validates, using the exposed service and diagnostic interfaces responsive to a container crash, functionality of the different code paths that provide the different services from the containerized application prior to bringing the containerized application back online within the virtualized container environment after the container crash.

FIG. 6 is a flow chart of an example of an implementation of a process 600 that provides additional details of options for implementing selective service-specific controls in a virtualized container environment. The process 600 can be executed by a container manager and represents a computer-implemented method of performing the selective container-based service controls described herein. The processing described in FIG. 6 may be provided as a service in the cloud computing environment.

At decision point 602, the process 600 begins iterative processing and makes a determination as to whether to deploy a container within a virtualized container environment. Deployment of a container may be an initial deployment or a deployment in response to life cycle management activities (e.g., a container upgrade, etc.). In response to determining not to deploy a container within the virtualized container environment, the process 600 makes a determination at decision point 604 regarding whether a container crash has been detected. In response to determining that a container crash has not been detected, the process 600 returns to decision point 602 and iterates as described above.

It should be noted that the two control paths detailed within the process 600 are identical other than processing in association with detection of a container crash. Initial processing responsive to a container crash will first be described to allow subtle differences of processing between a container deployment and a container crash to be described below.

As such, in response to determining at decision point 604 that a container crash has been detected, the process 600 reads logs for the containerized application code paths and control paths used by the containerized application at block 606. As described above, different service and diagnostic interfaces of a containerized application output service-specific log details that allow the container manager to identify which services were executing in association with a container crash.

In response to reading the log details of a container crash at block 606 or in response to determining at decision point 602 to deploy a container, the process 600 identifies exposed service and diagnostic interface details of each service provided by each containerized application within the container at block 608. It should be understood that a containerized application as described herein provides multiple different services that each have distinct service and diagnostic interfaces. Further, a container may include several different containerized applications that each provide multiple services, and the process 600 identifies the different code paths that provide the different services from the containerized application using the exposed service and diagnostic interfaces. As such, the processing at block 608 identifies exposed service and diagnostic interface details of each multi-service containerized application within the container. It should additionally be noted that processing responsive to a container crash further includes identifying a subset of the different code paths that provide the different services from the containerized application that were executing in association with the container crash. The log outputs produced by the exposed service and diagnostic interfaces of the containerized application in association with the container crash further identify the subset of the different code paths that provide the different services from the containerized application that were executing in association with the container crash. The process 600 may alternatively selectively validate only the services and service interfaces that were determined to be associated with the container crash.

At block 610, the process 600 validates code paths of each service using the exposed service and diagnostic interface(s). For container deployment, whether for a new container or for container life cycle management, the processing at block 610 allows the container manager to ensure the stability of the container prior to deployment or re-deployment of the container. For container crash processing, the processing at block 610 includes testing the identified subset of the different code paths that provide the different services from the containerized application that were executing in association with the container crash to confirm that the identified subset of the different code paths are functionally operational on the container prior to bringing the containerized application back online within the virtualized container environment after the container crash. Again, this testing and validation of the various code paths of a containerized application is performed for a subset of the services and service interfaces that were determined to be associated with the container crash, as appropriate for a given implementation.

At block 612, the process 600 validates external control paths used by each service of each containerized application. As such, the process 600 validates services outside of containerized application control that are used by the containerized application, including at least external application connectivity and external application routing. As with the code path testing described above, validation of the external control paths used by each service of each containerized application is performed for a subset of the services and service interfaces that were determined to be associated with the container crash, as appropriate for a given implementation.

At decision point 614, the process 600 makes a determination as to whether all services and external service interfaces are operational. This determination allows the process 600 to selectively disable any services for which the service code paths or the respective external control interfaces are not operational. In the case of a detected container crash, this processing allows the process 600 to prevent the container from crashing again for the same reason(s) as the detected container crash.

In response to determining that at least one of the services and external service interfaces are not operational, the process 600 disables any non-operational service of the containerized application at block 616. In the case of a container deployment or life cycle management, the process 600 disables, prior to bringing the containerized application online, at least one of the different code paths determined from the validation to be non-operational. Alternatively, in the case of a container crash, the process 600 disables at least one of the different code paths determined from the validation to have caused the container crash prior to bringing the containerized application back online after the container crash. The disabling of at least one of the different code paths is additionally performed responsive to identifying an error with at least one of the services outside of the containerized application control that are used by the containerized application prior to bringing the containerized application back online within the virtualized container environment after the container crash.

In response to disabling any non-operational service at block 616, or in response to determining at decision point 614 that all services and external service interfaces are operational, the process 600 executes/restores the validated services of the containerized application at block 618. In response to a container crash and the disabling of at least one service, the processing at decision point 614 includes restoring any of the different code paths that provide the different services for which functionality is validated to bring the containerized application back online with a reduced set of the different services provided from the containerized application within the virtualized container environment after the container crash. The process 600 returns to decision point 602 and iterates as described above.

As such, the process 600 allows a container manager to manage both initial deployment of containers and restoration of containers after container crashes. The container manager identifies and validates each service and service interface of each containerized application. The container manager disables any service that is determined to be non-operational, and executes/restores the validated services. The process 600 allows the container manager to bring a container online with only a subset of services activated/executed, either during initial deployment/life cycle management or in response to a container crash. Accordingly, the process 600 improves container stability by ensuring that containers are not deployed or re-introduced into a virtualized environment with services that, upon validation, are determined to lack proper functionality and interconnection.

Some embodiments of the present invention improve the technology of computers in one, or more, of the following ways: (i) improved stability of containerized computing environments, (ii) improved controllability of containerized applications, (iii) improved granularity of containerized application control, and (iv) improved visibility into and control of containerized application services and service interfaces.

The present invention is not abstract because it relates particularly to computer operations and/or hardware for reasons that include at least the following: (i) improves stability of containerized computing environments, (ii) improves controllability of containerized applications, (iii) improves granularity of containerized application control, and (iv) improves visibility into and control of containerized application services and service interfaces.

As described above in association with FIG. 1 through FIG. 6, the example systems and processes provide selective service-specific controls in a virtualized container environment. Many other variations and additional activities associated with selective service-specific controls in a virtualized container environment are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    by a processor that executes a container manager:
        executing, within a container in a virtualized container environment, a containerized application that exposes service and diagnostic interfaces that allow the container manager to interact with and control different code paths that provide different services from the containerized application; and
        validating, using the exposed service and diagnostic interfaces responsive to a container crash, functionality of the different code paths that provide the different services from the containerized application prior to bringing the containerized application back online within the virtualized container environment after the container crash;
        validating services outside of containerized application control that are used by the containerized application, comprising at least external application connectivity and external application routing; and
        disabling, prior to bringing the containerized application back online within the virtualized container environment after the container crash, at least one of the different code paths responsive to identifying an error with at least one of the services outside of the containerized application control that are used by the containerized application.

2. The computer-implemented method of claim 1, further comprising the processor that executes the container manager:
    disabling, prior to bringing the containerized application back online within the virtualized container environment after the container crash, at least one of the different code paths determined from the validation to have caused the container crash.

3. The computer-implemented method of claim 1, further comprising the processor that executes the container manager:
    restoring any of the different code paths that provide the different services for which functionality is validated to bring the containerized application back online with a reduced set of the different services from the containerized application within the virtualized container environment after the container crash.

4. The computer-implemented method of claim 1, further comprising the processor that executes the container manager:
    identifying the different code paths that provide the different services from the containerized application using the exposed service and diagnostic interfaces.

5. The computer-implemented method of claim 1, where validating, using the exposed service and diagnostic interfaces responsive to the container crash, the functionality of the different code paths that provide the different services from the containerized application prior to bringing the containerized application back online within the virtualized container environment after the container crash comprises the processor that executes the container manager:
    identifying, utilizing log outputs produced by the exposed service and diagnostic interfaces of the containerized application, a subset of the different code paths that provide the different services from the containerized application that were executing in association with the container crash; and
    testing the identified subset of the different code paths that provide the different services from the containerized application that were executing in association with the container crash to confirm that the identified subset of the different code paths are functionally operational on the container prior to bringing the containerized application back online within the virtualized container environment after the container crash.

6. The computer-implemented method of claim 1, where the virtualized container environment comprises a cloud computing environment, and at least one of the executing and the validating is provided as a service in the cloud computing environment.

7. A system, comprising:
    a memory; and
    at least one processor(s) set that executes a container manager, the at least one processor(s) set being programmed to:

execute, from within the memory and within a container in a virtualized container environment, a containerized application that exposes service and diagnostic interfaces that allow the container manager to interact with and control different code paths that provide different services from the containerized application;

validate, using the exposed service and diagnostic interfaces responsive to a container crash, functionality of the different code paths that provide the different services from the containerized application prior to bringing the containerized application back online within the virtualized container environment after the container crash;

validate services outside of containerized application control that are used by the containerized application, comprising at least external application connectivity and external application routing; and disable, prior to bringing the containerized application back online within the virtualized container environment after the container crash, at least one of the different code paths responsive to identifying an error with at least one of the services outside of the containerized application control that are used by the containerized application.

8. The system of claim 7, where the at least one processor(s) set is further programmed to:
disable, prior to bringing the containerized application back online within the virtualized container environment after the container crash, at least one of the different code paths determined from the validation to have caused the container crash.

9. The system of claim 7, where the at least one processor(s) set is further programmed to:
restore any of the different code paths that provide the different services for which functionality is validated to bring the containerized application back online with a reduced set of the different services from the containerized application within the virtualized container environment after the container crash.

10. The system of claim 7, where the at least one processor(s) set is further programmed to:
identify the different code paths that provide the different services from the containerized application using the exposed service and diagnostic interfaces.

11. The system of claim 7, where in being programmed to validate, using the exposed service and diagnostic interfaces responsive to the container crash, the functionality of the different code paths that provide the different services from the containerized application prior to bringing the containerized application back online within the virtualized container environment after the container crash, the at least one processor(s) set is programmed to:
identify, utilizing log outputs produced by the exposed service and diagnostic interfaces of the containerized application, a subset of the different code paths that provide the different services from the containerized application that were executing in association with the container crash; and
test the identified subset of the different code paths that provide the different services from the containerized application that were executing in association with the container crash to confirm that the identified subset of the different code paths are functionally operational on the container prior to bringing the containerized application back online within the virtualized container environment after the container crash.

12. A computer program product, comprising:
a computer readable storage medium having computer readable program code embodied therewith, where the computer readable storage medium is not a transitory signal per se and where the computer readable program code when executed on a computer that executes a container manager causes the computer to:
execute, within a container in a virtualized container environment, a containerized application that exposes service and diagnostic interfaces that allow the container manager to interact with and control different code paths that provide different services from the containerized application;
validate, using the exposed service and diagnostic interfaces responsive to a container crash, functionality of the different code paths that provide the different services from the containerized application prior to bringing the containerized application back online within the virtualized container environment after the container crash; and
validate services outside of containerized application control that are used by the containerized application, comprising at least external application connectivity and external application routing; and
disable, prior to bringing the containerized application back online within the virtualized container environment after the container crash, at least one of the different code paths responsive to identifying an error with at least one of the services outside of the containerized application control that are used by the containerized application.

13. The computer program product of claim 12, where the computer readable program code when executed on the computer that executes the container manager further causes the computer to:
disable, prior to bringing the containerized application back online within the virtualized container environment after the container crash, at least one of the different code paths determined from the validation to have caused the container crash.

14. The computer program product of claim 12, where the computer readable program code when executed on the computer that executes the container manager further causes the computer to:
restore any of the different code paths that provide the different services for which functionality is validated to bring the containerized application back online with a reduced set of the different services from the containerized application within the virtualized container environment after the container crash.

15. The computer program product of claim 12, where the computer readable program code when executed on the computer that executes the container manager further causes the computer to:
identify the different code paths that provide the different services from the containerized application using the exposed service and diagnostic interfaces.

16. The computer program product of claim 12, where, in causing the computer to validate, using the exposed service and diagnostic interfaces responsive to the container crash, the functionality of the different code paths that provide the different services from the containerized application prior to bringing the containerized application back online within the virtualized container environment after the container crash, the computer readable program code when executed on the computer that executes the container manager causes the computer to:

identify, utilizing log outputs produced by the exposed service and diagnostic interfaces of the containerized application, a subset of the different code paths that provide the different services from the containerized application that were executing in association with the container crash; and test the identified subset of the different code paths that provide the different services from the containerized application that were executing in association with the container crash to confirm that the identified subset of the different code paths are functionally operational on the container prior to bringing the containerized application back online within the virtualized container environment after the container crash.

17. The computer program product of claim 12, where the virtualized container environment comprises a cloud computing environment, and at least one of the executing and the validating is provided as a service in the cloud computing environment.

\* \* \* \* \*